United States Patent [19]
Chivari

[11] 3,923,133
[45] Dec. 2, 1975

[54] ROTARY SPEED FOR SUPPLYING FLUID PRESSURE TO A CLUTCH

[76] Inventor: Ilie Chivari, Berliner Str. 1, 468 Wanne-Eickel, Germany

[22] Filed: June 14, 1974

[21] Appl. No.: 479,220

[30] Foreign Application Priority Data
June 16, 1973 Germany............................ 2330750
Sept. 1, 1973 Germany............................ 2344165

[52] U.S. Cl............. 192/85 R; 192/85 AA; 137/580
[51] Int. Cl.²......................................... F16D 25/00
[58] Field of Search...... 192/85 AA, 85 R; 137/580; 285/134

[56] References Cited
UNITED STATES PATENTS

| | | | |
|---|---|---|---|
| 1,523,822 | 1/1925 | Marret............................ | 285/134 X |
| 2,310,309 | 2/1943 | Orr................................ | 192/85 R X |
| 2,401,061 | 5/1946 | Fawick............................ | 137/580 |
| 3,776,270 | 12/1973 | Wagner............................ | 137/580 |

*Primary Examiner*—Benjamin W. Wyche
*Attorney, Agent, or Firm*—Darbo, Robertson & Vandenburgh

[57] ABSTRACT

A pneumatically engageable clutch for coupling a rotating shaft with a rotatable member comprises a compressed air passage in the rotating shaft. The compressed air passage opens in a port in the peripheral surface of the shaft. A stationary casing surrounds the shaft and has an annular chamber adjacent the port, compressed air being supplied to the annular chamber. The annular chamber is sealed by packing rings, such as Simmer rings, made of elastomeric material an engaging the shaft. To reduce the pressure difference across the packing rings, hydraulic pressure is applied to the outsides of the packing rings. Control means keep the hydraulic pressure substantially equal to the compressed air pressure. In one embodiment, the control means comprise a slide valve. In another embodiment, the control means comprise a partially oil-filled closed system which includes chambers axially outside of the packing rings, the compressed air pressure acting statically on the oil level.

20 Claims, 6 Drawing Figures

ROTARY SPEED FOR SUPPLYING FLUID PRESSURE TO A CLUTCH

BACKGROUND AND SUMMARY OF THE INVENTION

This invention relates to a pneumatically engageable clutch for coupling a rotating shaft with a rotatable member, compressed air being supplied to the clutch through a compressed air passage in said rotating shaft.

Such clutches are, for example, used in ship propulsion installations. Therein the propeller is driven by an engine through a resilient coupling, a clutch and a gear transimission. In prior art propulsion installations, the input and output shafts of the gear transmission, of which one shaft is connected to one clutch member of the clutch and the other one is connected to the propeller are laterally offset. The clutch is actuated by compressed air. This involves the problem to supply the compressed air for the actuation of the clutch to the rotating elements. In prior art ship propulsion installations this is done through the end face of the transmission input shaft which is accessible because of its lateral offset with respect to the output shaft. There are, however, also transmissions, such as planetary gearings, in use of which input and output shafts are aligned with each other. In such transmissions the end face of the transmission input shaft, carrying one clutch members of the clutch, is not accessible. In such installations the supply of compressed air to rotating elements of the clutch presents considerable problems.

Similar problems can, of course, be encountered also in other clutches than those of the ship propulsions installations described.

It is an object of the invention to provide a clutch which permits the supply of compressed air for engaging the clutch to clutch members rotating with a shaft, regardless of whether the end face of the shaft is accessible or not.

According to the invention, to achieve this object the compressed air passage opens at the cylindrical surface of the shaft. The shaft is surrounded by a stationary casing which defines an annular chamber adjacent the orifice of the compressed air passage. The annular chamber is open towards the shaft. Compressed air is supplied to this annular chamber. On both sides of the annular chamber, there are radially-acting substantially air-tight shaft sealing means between the casing and the rotating shaft.

Thus, in the clutch of the invention, there is a radial supply of air through the cylindrical surface of the shaft. This makes the clutch independent of the situation at the end face of the shaft. The compressed air can be supplied at any desired location along the shaft.

Sealing the shaft in the stationary casing, such that the annular chamber is closed to be air-tight, may sometimes lead to design problems. Therefore, in accordance with a further improvement of the invention, the shaft sealing means are exposed to hydraulic pressure on their outsides. A control device is provided by which the hydraulic pressure is controlled as a function of the pressure of the compressed air to limit the pressure difference acting on the shaft sealing means. There are no problems in providing an oil-tight seal between the stationary casing and the rotating shaft. In this respect the situation is more favourable with oil under pressure than with compressed air. By exposing the "outsides" of the shaft sealing means to hydraulic pressure which is controlled as a function of the pressure of the compressed air, the pressure difference at the shaft sealing means can be kept low. Thereby the leakage of compressed air through the shaft sealing means is counteracted.

As the pressure difference across the shaft sealing means can be limited in this manner, the shaft sealing means may comprise packing rings of elastomeric material, such as simmer rings. As is well known, such packing ring prvide an air-tight seal between a stationary casing and a rotating shaft. However they are able to withstand only a limited pressue difference across the packing ring. Such a limitation of the pressure difference is effected by exposing the outsides of the shaft sealing means to hydraulic pressure.

The control device for controlling the hydraulic presure may comprise a slide valve member sliding in a valve body. The slide valve member is exposed, on one side thereof, to compressed air pressure and, on the other side, to hydraulic pressure. The slide valve member governs a liquid outlet port which is progressively opened, when the slide valve member moves towards the compressed air side. Thereby the slide valve member will assume a position in which the liquid outlet is opened to an extent to make the hydraulic pressure balance the pressure of the compressed air.

The slide valve member may be biased by a compression spring on the side of the compressed air. In other cases it might be preferable that the valve member is biased by a compression spring on the side of the hydraulic pressure. In the former case, the hydraulic pressure will be a little larger than the compressed air pressure by an amount defined by the bias of the compression spring. This may be advantageous in order to hold the packing rings in sealing engagements with the periphery of the rotating shaft portions by the hydraulic pressure. Sometimes this might even result in an undesirably high wear, so that it might be desirable to keep the air pressure slightly larger than the hydraulic pressure. In this case the latter arrangement comprising a compression spring on the hydraulic side would be used. An air pressure exceeding the hydraulic pressure is preferable, in particular, in all these cases where the nature of the sealing means involves the risk of leakage. With the air pressure exceeding the hydraulic pressure, air would leak, to a small extent, into the oil. Apart from the negligible air loss, this would not do any harm. However, with a slightly higher air pressure, leakage of oil into the compressed air passage and thus into the clutch, which is by no means permissible, will be safely avoided.

In order to damp the movement of the slide valve member and to eliminate any pulsation of the slide valve, the slide valve member may be sealingly guided in the bore of the valve body on both sides of a turned-out circumferential groove. As oil inlet port opens in the bore of the valve body adjacent the circumferential groove. The communication between the circumferential groove and an oil outlet port is governed by the peripheral surface of the slide valve member. The chamber formed in the valve body in front of the end face, on the hydraulic side, of the slide valve member communicates with the circumferential groove through a passage containing a restrictor.

In order to improve the load bearing capacity of the packing rings with respect to pressure differences, the annular space may be defined by an internal annular groove of a metal annular member, the packing rings being arranged in front of the end faces of this annular member. Collars of the packing rings extending axially outwards and having a beaded edge are held in engagement with the rotating shaft portions by toroidal springs surrounding them. The collars are supported by axially projecting edge portions along the inner circumference of said end faces.

The hydraulic pressure can be applied to the outside of the packing rings by providing hydraulic pressure chambers in a casing surrounding the shaft outwards of the packing rings, said hydraulic pressure chambers being sealed towards atmosphere by a bearing bushing each and by piston rings in grooves in the rotating shaft portions. As already stated, there are no substantial problems providing an oil seal between stationary and rotating members. The bearing bushings may have radial flanges at their inner ends, each flange abutting the end face of the adjacent hydraulic pressure chamber, whereby a seal between the bearing bushings and the casing is provided. Oil under pressure leaking nevertheless along the rotating shaft can be drained by arranging outer packing rings in the casing outwards of the bearing bushings to provide an additional seal towards atmosphere, the chambers defined between the bearing bushings being connected to a drain reservoir.

The rotating shaft portions engaged by the packing rings ought to be ground and hardened. To avoid the necessity of hardening the whole shaft, the said rotating shaft portions preferably are a ground and hardened sleeve rotating together with the shaft. This sleeve may be mounted on the shaft by having its end faces turned out along their inner circumferences, the sleeve being held between two bushings, which are also mounted on the shaft, have radial flanges and are axially retained by snap rings. The turned-out end faces extend over the bushings, the outer ends engaging the flanges. Sealing rings (O-rings) are interposed between the shaft and the turned-out end faces to provide an axial seal.

As an additional safety measure, in order to prevent any damage of the shaft sealing means even in case of malfunction, such as a failure of the oil pump, there may be a sensor responding to the pressure difference between compressed air pressure and hydraulic pressure, said being adapted to shut off the air supply if the pressure difference exceeds a predetermined threshold.

In the embodiment described hereinbefore, there might be a short time delay between the application of compressed air and the application of a hydraulic counter-pressure on the outsides of the shaft sealing means.

It is a further object of the invention to design a pneumatically engageable clutch of this type, in which the hydraulic pressure becomes effective on the outside of the shaft sealing means without delay.

In accordance with the invention the hydraulic pressure is generated in a closed system partially filled with oil, which communicates, above the oil level, with a compressed air supply passage leading to the said annular chamber.

According to this modification of the invention the hydraulic pressure on the outside of the packing ring is not generated dynamically by means of a pump and a control slide valve but statically in that the compressed air pressure acts on the surface of an oil volume in a closed system. Thus there is a direct static pressure propagation from the compressed air into the oil, whereby the hydraulic pressure becomes effective without delay upon occurrence of compressed air pressure.

As this is a closed system and there is no permanent return of the oil by a pump, the system has to be made sufficiently oil-tight.

The sealing effect is favourably affected by the use of a highly viscous oil.

Annular spaces defined by the casing axially outwards of the packing rings may be sealed in oil-tight manner towards the shaft and may communicate with an oil reservoir located above the casing, a pressure transmitting conduit being connected to the compressed air supply conduit and opening in the top of the said reservoir.

In order to seal the annular spaces mentioned, annular bodies may be mounted sealingly and axially movable on the shaft and have their outer end faces in sealing and sliding engagement with the end faces of the annualar chambers. Sleeves of resistant and low friction plastics, such as polytetraflourethylene, can be mounted on the periphery of said annular bodies. The annular bodies may consist of low friction synthetic plastics. Alternatively the annular bodies may consist of sinter metal which is porous to a certain degree, whereby the gliding surface are lubricated by oil slowly leaking therethrough.

In addition the shaft or a sleeve rotating with the shaft may be mounted in journal bearings axially inwards of said annular bodies. Also these journal bearings provide a seal towards atmosphere, so that, in practice, there are nearly no oil losses.

DESCRIPTION OF SPECIFIC EMBODIMENTS

Figure 1:
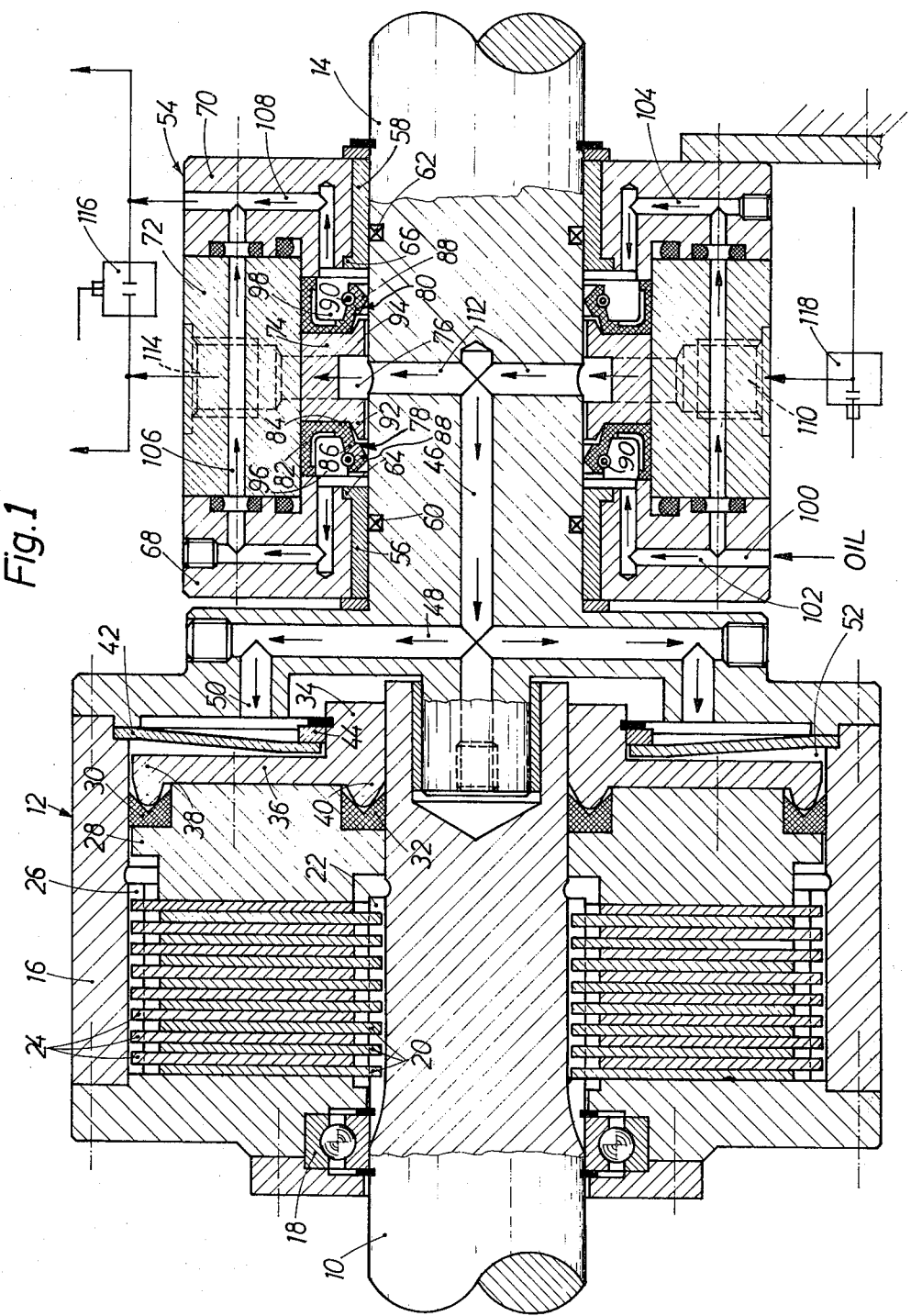
FIG. 1 is a longitudinal sectional view of a clutch of the invention.

Referring to FIG. 1, a shaft 10 is coupled to a rotating shaft 14 through a conventional pneumatically engageable multiple disc clutch. The clutch comprises a cylindrical clutch casing 16 which is affixed to shaft 14 and is mounted on shaft 10 through a ball bearing 18. A set of radial discs 20 is supported within clutch causing 16, said discs 20 being splined to shaft 10 by keyways 22 but being axially movable. Discs 24 extend radially inwards between the discs 20 and are splined at their periphery to the clutch casing by keyways 26, discs 24 being also axially movable. The discs 20 and 24 are arranged to be compressed by a piston 28. Piston 28 is guided on shaft 10. Sealing gaskets 30 and 32 of elastomeric material are provided along the outer and inner circumference, respectively, of the piston 28. The sealing gaskets 30 and 32 have a respective annular groove of v-shaped cross section on their sides remote from the discs 20, 24. A thrust member 34 engages the annular groove and has a hub slidably mounted on the shaft. The thrust member has a radial flange 36, which carries annular projection 38 and 40 engaging the annular grooves of the sealing gaskets.

An annular cup spring 42 having its peripheral edge clamped in the clutch casing 12 presses against a ring 44 mounted on the hub of the thrust member and urges the thrust member 34 towards the right in figure 1. Thereby the sealing gaskets are relieved, whereby the piston 28 is able to give way without substantial frictional resistance and the pressure on the clutch discs 20 and 24 is normally removed.

This is the state in which the clutch connection between the shafts 10 and 14 is disengaged. In order to engage the clutch, compressed air is supplied through a compressed air passage 46, extending through shaft 14 and having radical branch bores 48 and axial bores 50, to a chamber 52 of the clutch casing 16 on the side of piston 26 and thrust member 34 remote from the discs 20, 24. The thrust member 34 engages the sealing gaskets 30, 32 with its annular projections 38 and 40, respectively whereby the sealing gaskets are urged into engagement with the shaft 10 and the internal wall of the clutch casing and a tight seal is ensured. The piston 28 will be moved to the left under the action of the compressed air and the discs 20 and 24 will be compressed. Thereby drive connection between the rotating shaft 14 and the shaft 10 is established.

The problem is to supply compressed air for engaging the clutch 12 to the compressed air supply passage.

To this end a stationary casing 54 is arranged around shaft 14. The shaft 14 is mounted in casing 54 in bearings bushings 56, 58. A substantially oil-tight seal between the bearing bushings and the shaft is achieved by piston rings 60, 62. The bearing bushings 56 and 58 have radial flanges 64 and 66, respectively, at their inner ends, said flanges 64, 66 engaging the inner wall of casing 54.

The casing 54 is a multiple-part one, comprising parts 68 and 70 forming the end faces of the casing and containing the bearing bushings 56, 58, and an annular part 72 forming the substantial portion of the peripheral surface of the casing 54. Inside the annular part 72 is a metal annular member 74 which has an internal annular groove defining an annular chamber 76 adjacent the shaft 14 and open towards this shaft.

A pair of packing rings 78 and 80 of elastomeric material are located between the metal annular member 74 and the casing parts 68 and 70 as well as annular casing part 72. The packing rings 78 and 80 comprise an outer collar 82, an adjacent radial ring portion 84 and, on the inner side, a collar or lip 86. The collar 86 engages the cylindrical surface of the shaft 14 with a beaded edge 88. A toroidal spring 90 surrounding the collar 86 holds the beaded edge 88 in engagement with the shaft 14. The arrangement is such that the ring portions or collars 82 extends from the metal annular member 74 and engage the inner surface of the annular part 72 of casing 54. The radial ring portions 84 engage the end faces of the metal annular member 74. The annular member 74 has axially projecting edge portions 92, 94 along the inner circumferences of its end faces, the edge portions 92, 94 supporting the collars 86 of the packing rings 78 and 80. Thereby the load carrying capacity of the packing rings 78 and 80 with respect to pressure is increased.

Hydraulic pressure chambers 96 and 98 are formed in the casing inside of the packing rings 78 and 80, respectively. Oil under pressure is supplied to these annular hydraulic pressure chambers 96 and 98 through an oil supply port 100 and passages 102 and 104, respectively. In addition the hydraulic pressure chambers 96 and 98 communicate with a control device to be described hereinbelow through passages 106 and 108.

Compressed air is supplied to the annular chamber 76 through a port 110. The compressed air supply passage 46 in the rotating shaft 14 opens at the cylindrical surface of shaft 14 through radial bores 112 adjacent this annular passage, whereby compressed air from port 110 is supplied to pressure chamber 52 of clutch 12, through the radial bores 112 and the compressed air passage 46, and urges the piston 28 to the left to engage the clutch.

The pressure of the compressed air is also applied to the control device (not shown in FIG. 1) through a port 114. This control device arranges for the hydraulic pressure of the oil to be related in a well-defined manner to the compressed air pressure, whereby the pressure difference prevailing across the packing rings 78 and 80, respectively, is limited. A pressure difference sensor 116 exposed to the pressure difference between the air pressure at port 114 and hydraulic pressure from connecting passages 106 and 108 causes the shutting off of the compressed air through a shutoff device 118, if the pressure difference, for whatever reason, exceeds a critical value.

The arrangement described with reference to FIG. 1 may be a clutch device, for example, in machine tools, in which the whole device is located within a casing having an oil sump. Leak oil which leaks along shaft 14 between the shaft and the bearing bushings 56, 58 or piston rings 60, 62 is then simply drained to the oil sump.

Figure 2:
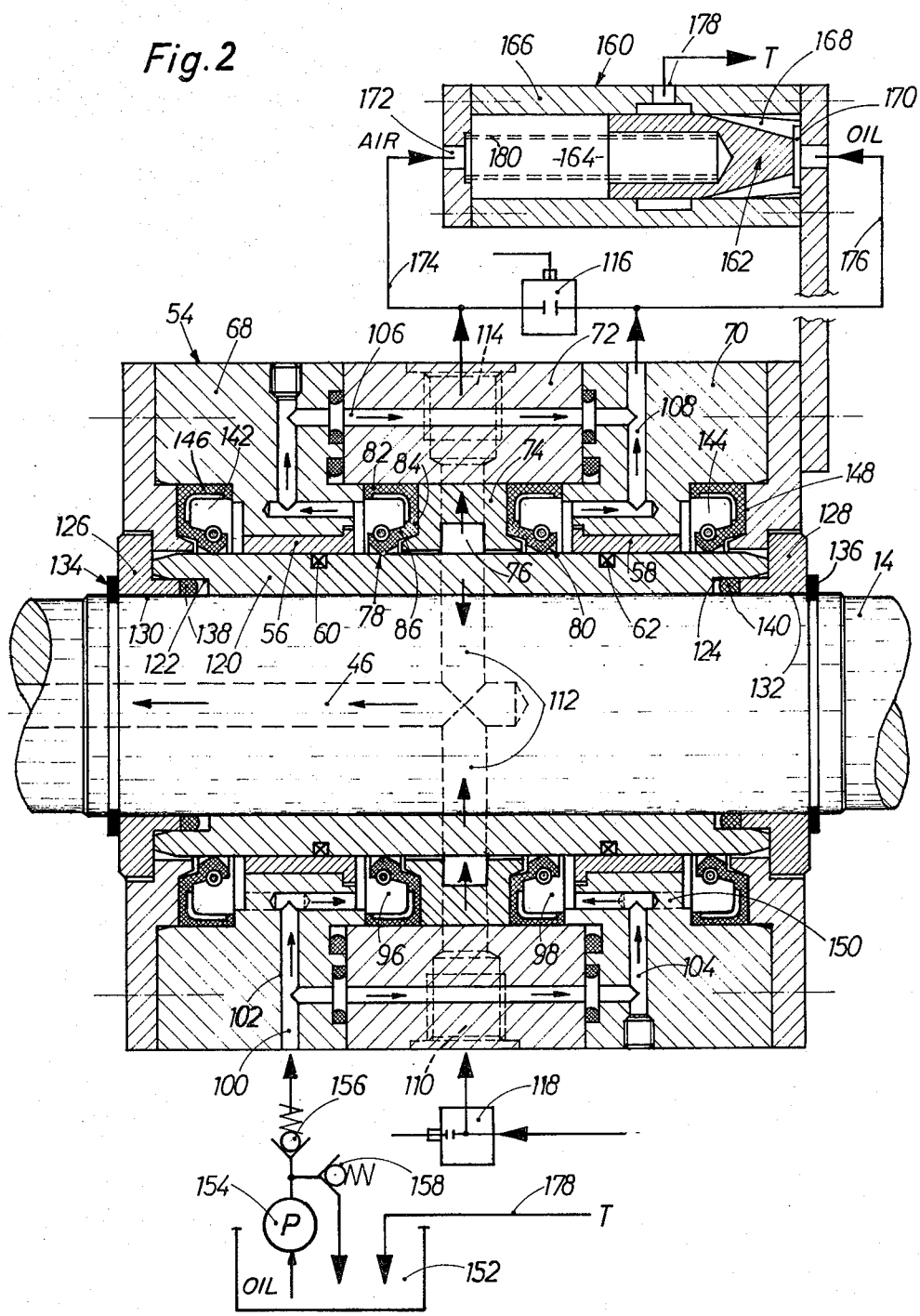
FIG. 2 is a longitudinal sectional view of a modification of the air supply and sealing means in a clutch of the invention.
Figure 3:
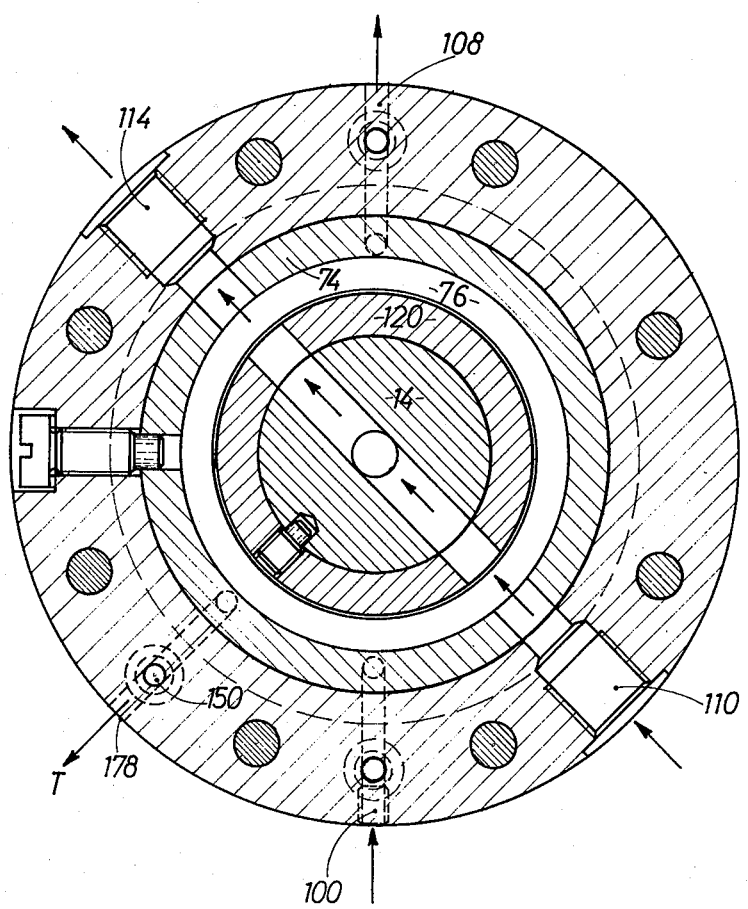
FIG. 3 is a sectional view of the device of FIG. 2.

FIGS. 2 and 3 show a sealing arrangement in a clutch device of the invention, which can be used, for example, in ship propulsion installations, and in which an additional seal is provided preventing the leakage of leak oil. The structure of the sealing arrangement of FIG. 2 is similar to that described with reference to FIG. 1. Corresponding parts bear the same reference numerals as there.

In order to avoid the necessity of hardening and grinding the whole shaft, a hardened and ground sleeve 120 is placed on the cylindrical surface of shaft 14 in the embodiment of FIGS. 2 and 3. The sleeve 120 has its end faces turned-out along their inner circumferences. With the turned-out portions 122 and 124 the sleeve 120 extends over two bushings 130 and 132, respectively, mounted on shaft 14 and having radial flanges 126, 128. The bushings are retained on shaft 14 in axial direction by snap rings 134, 136. The sleeve 120 engages the flanges with the outer ends of its end faces. Sealing rings (O-rings) are placed between the turned-out portions 122, 124 of sleeve 120 and the shaft 14, these sealing rings providing axial seals between the shaft and the turned-out portions, i.e. sleeve 120.

In the embodiment of FIG. 2 additional chambers 142 and 144 are defined by the casing 52 axially outwards of the bearing bushings 56 and 58, respectively, said additional chambers being sealed by packing rings 146, 148 similar to packing rings 78 and 80 but having inwardly extending collars. These additional chambers are connected to a drain reservoir 152 through conduits 150.

The hydraulic pressure is provided by a pump 154 which supplies oil under pressure from the reservoir 152 through a check valve 156 to the oil port 100. The pump output pressure is limited in conventional manner by a spring-loaded valve 158.

Reference numeral 160 designates the hydraulic pressure control device. The control device is in the form of a slide valve member 162 sliding in the bore 164 of a slide valve body 166. The slide valve member is substantially cylindrical and has a recess 168 in its peripheral surface at its end at the oil-under-pressure side, said recess 168 widening towards this end. In addition the slide valve member 162 has a shallow recess 170 at its righthand end in FIG. 2, in order to present a well-defined area on which the oil under pressure may act, if the slide valve member is in its righthand end position in FIG. 2. Compressed air is supplied to the valve body 166 through a port 172 at the lefthand end face in FIG. 2. To this end, the port 172 is connected through a conduit 174 to the port 114 of casing 54. At its other end face the slide valve member 162 is exposed to hydraulic pressure from passage 106, 108 through a conduit 176. The slide valve member governs an outlet port 178 which communicates with the drain reservoir 152. In the embodiment of FIG. 2, the slide valve member is biased by a weak spring 180 on the compressed-air side, whereby to balance the control valve, the hydraulic pressure is slightly higher than the compressed air pressure.

The device described operates as follows: When compressed air is supplied through port 110 to the annular chamber 76 and thus to the compressed air supply passage, the pressure of this compressed air will act on the lefthand end face of slide valve member 162 through port 114, conduit 174 and port 172. Thereby the slide valve member 162 is urged to the right in FIG. 2, whereby the outlet port is throttled. Due to the throttling of the outlet port, the hydraulic pressure applied through port 100 and prevailing in the pressure chambers 96 and 98 is increased. In the absence of compressed air pressure, this hydraulic pressure is also substantially atmospheric pressure, as the hydraulic pressure moves the slide valve member 162 to the left and the outlet port 178 is unrestricted. Now there will be a position of the slide valve member in which the outlet port 178 is restricted to such an extent that the hydraulic pressure (apart from the biasing thrust exerted by spring 180) is substantially equal to the compressed air pressure. If the hydraulic pressure rises to exceed the compressed air pressure, the slide valve member 162 is moved to the left in FIG. 2, whereby an additional outlet area is uncovered through recesses 168. If the compressed air pressure rises to exceed the hydraulic pressure, the slide valve member 162 is moved to the right, whereby the oil outlet is more heavily restricted.

Thus substantially the same pressure prevails on both sides of each packing ring 78 and 80, whereby there cannot be an overstressing of the packing ring.

Figure 4:
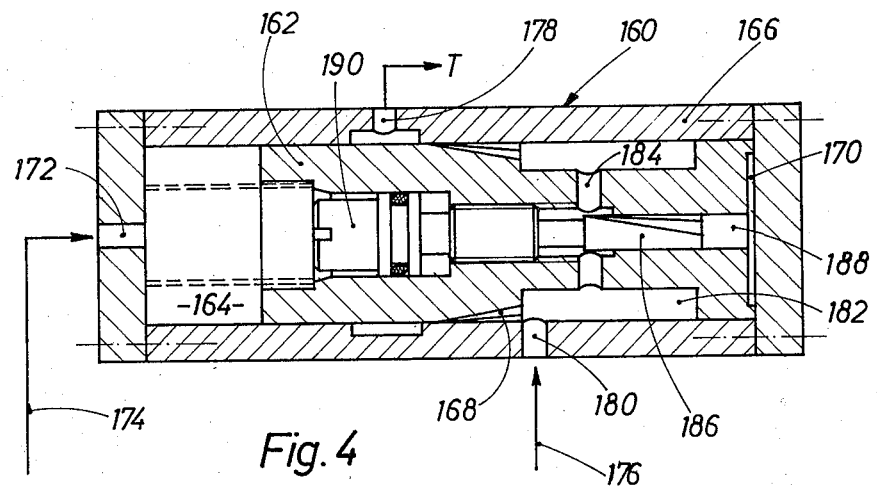
FIG. 4 shows a modification of the control device for controlling the hydraulic pressure as a function of the pressure of the compressed air.
Figure 5:
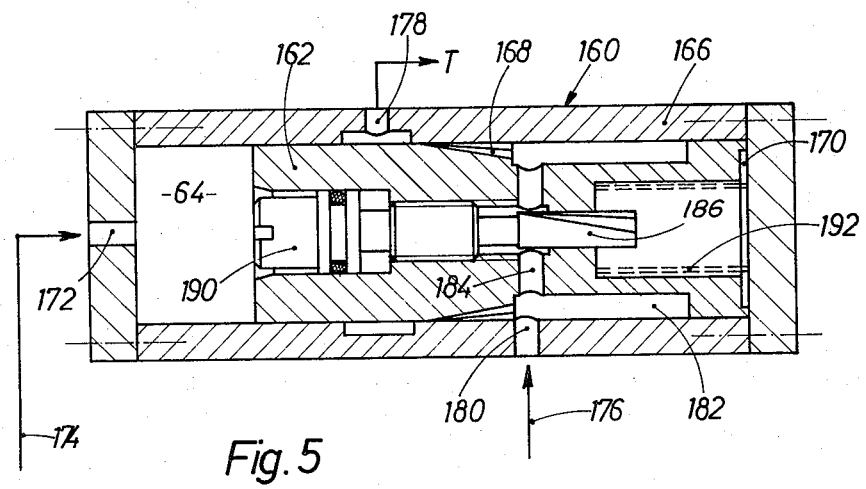
FIG. 5 shows a further modification of the control device.

FIGS. 4 and 5 show other embodiments of the control device.

In the embodiment of FIG. 4 the slide valve member 162 is not biased in any direction so that it controls the hydraulic pressure to exactly balance the compressed air pressure. In addition, in the embodiment of FIG. 4, the oil under pressure from conduit 176 is not supplied directly to the end face of the slide valve member 162. The oil under pressure rather flows through a port 180 to a circumferential groove 182 in the peripheral surface of the slide valve member 162. The slide valve member 162 is sealingly guided in the valve body 166 on both sides of the circumferential groove 182. Recesses 168 communicate with the circumferential groove 182, through which recesses, as in the embodiment of FIG. 2, the connection between the oil port 180 and the outlet port 178 is established depending on the position of the slide valve member. The oil under pressure is, however, applied to the end face of the slide valve member 162 through radial passages 184, a restrictor 186 and an axial passage 188 opening into recess 170. This offers the advantage that the movement of the slide valve member 162 in the valve casing 166 is damped and no pulsating movements can build up.

The restrictor may be adjustable by means of a set screw.

The embodiment of FIG. 5 is of similar design as the embodiment of FIG. 4, and corresponding parts bear the same reference numerals as there. The difference of the embodiment of FIG. 5 as compared to that of FIG. 4 is a compression spring 192 acting on the slide valve member 162 from the oil-under-pressure side. Thereby the pressure of the compressed air is always slightly larger than the hydraulic pressure.

One advantage of the devices described is that a continuous cooling of the shaft sealing means is achieved by the continuously circulating oil under pressure. This avoids undesirable heating up of the shaft sealing means due to frictional heat, which might eventually lead to the destruction of the shaft sealing means.

Figure 6:
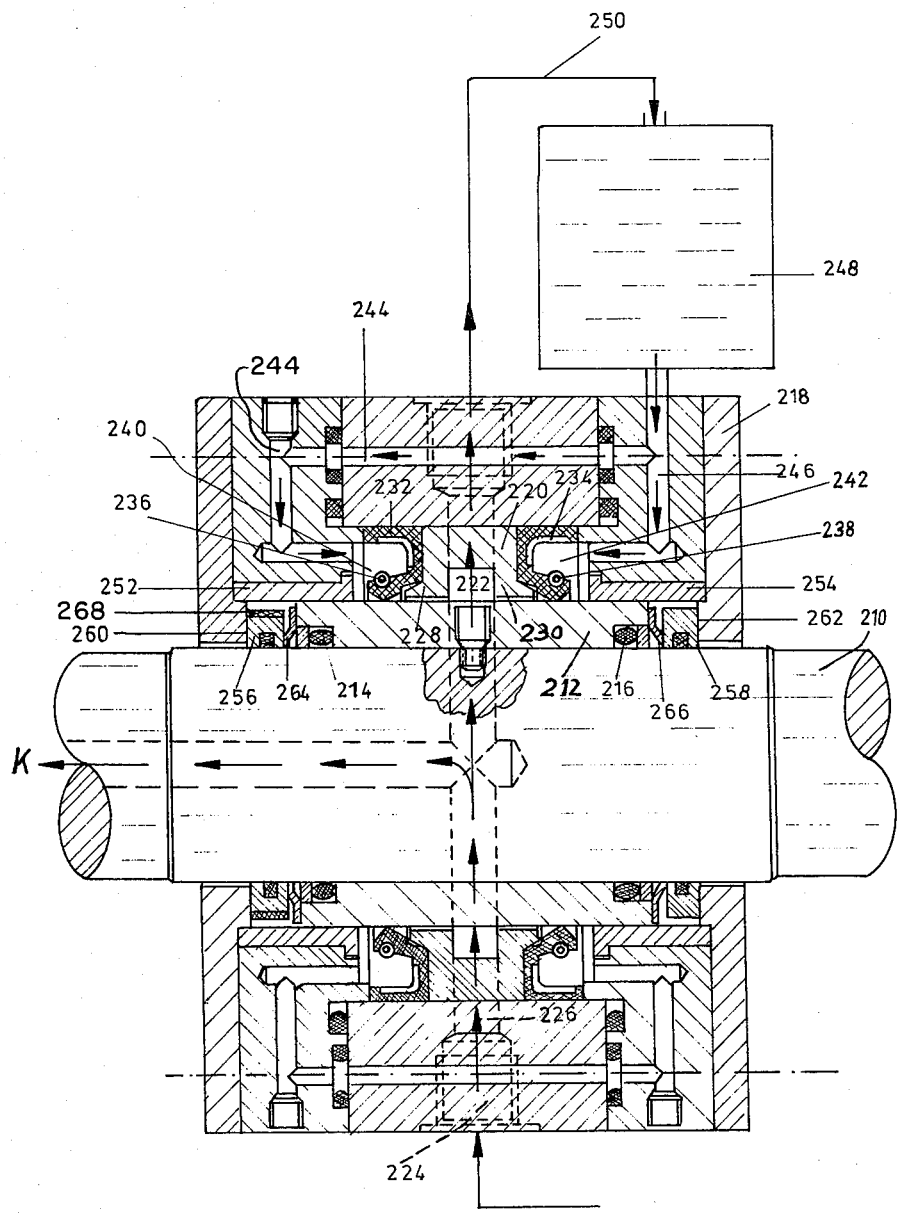
FIG. 6 is a longitudinal sectional view of air supply and sealing means with static generation of the hydraulic counter-pressure.

FIG. 6 illustrates an embodiment, in which the hydraulic counter-pressure is provided as a static pressure by purely static means.

Referring to FIG. 6, reference numeral 210 designates a rotating shaft, on which a hardened sleeve 212 is located, sleeve 212 rotating together with the shaft 210 and is sealed with respect to the shaft 210 by sealing rings 214, 216 on the inside.

Sleeve 212 is surrounded by a casing 218. The casing 218 comprises a metal annular member 220 which has an annular groove 222 on its inside. This annular groove 222 defines an annular chamber open towards the shaft 210 or sleeve 212, respectively, compressed air being supplied to this annular chamber from a compressed air port 224 through radial passages 226. The metal annular member 220 has axially projecting edge portions 228, 230. Packing rings 232, 234 are located in front of the end faces of the metal annular body 220. The packing rings are provided with outwardly extending collars, having beaded edges thereof held in engagement with the shaft by surrounding toroidal springs 236 and 238, respectively. The collars are supported by the axially projecting edge portions 228 and 230, respectively, of the metal annular member 220 to increase the load-bearing capacity of the packing rings.

Annular chambers 240, 242 are defined by the casing axially outwards of the packing rings 232 and 234, respectively. These annular chambers 240, 242 are in communication with a reservoir 248 through passages 244 and 246, respectively. Reservoir 248 is located above casing 218 and is filled with a highly viscous oil. A pressure transmitting conduit 250 communicating with annular chamber 222 opens into reservoir 248 above the oil level therein. Thereby the compressed air pressure in chamber 222 becomes effective statically and directly as hydraulic pressure within the annular chambers 240 and 242. There is practically no delay, as there is now fluid flow in passages 244 and 246 and the oil is practically incompressible.

To seal the annular chambers 240 and 242, the sleeve 212 is, primarily, mounted in journal bearings 252 and 254 in the casing 218. To provide an additional seal, annular bodies 256 and 258 are sealingly and axially movably mounted on the shaft. These annular bodies rotate with the shaft. The annular bodies 256 and 258 have their outer end faces in engagement with the end faces 260 and 262, respectively, of the annular chambers 240 and 242. They are held in engagement with the end faces 260 and 262, respectively, by springs 264 and 266, respectively, such as cup spring having radially inwardly extending fingers. A further seal can be provided, as shown in the lefthand portion of FIG. 6, by means of a sleeve 268 of resistant and low friction synthetic plastics, such as polytetrafluoroethylene, said sleeve 268 being mounted on the peripheral surface of the annular body 256. This sleeve also engages the end face 260.

As already explained above, the annular body may consist of low friction synthetic plastics or of sinter metal to reduce friction and wear.

I claim:

1. In a pneumatically engageable clutch for coupling a rotating shaft with a rotatable member, comprising:
   a pneumatically operated, clutch engaging actuator means, mounted to rotate with said rotating shaft,
   a compressed air passage extending through said shaft, said compressed air passage having an inlet and outlet, said outlet being connected to said actuator means, and
   means for supplying compressed air from a stationary external source to said inlet of said compressed air passage, the improvement
   wherein said inlet of said compressed air passage forms an orifice in the cylindrical surface of said shaft
   and wherein said compressed air supplying means comprises:
   a stationary casing surrounding said shaft and forming an annular chamber adjacent said inlet orifice of said compressed air channel and open towards said shaft,
   radially-acting substantially air-tight shaft sealing means provided between said casing and said rotating shaft on both sides of said annular chamber,
   means for exposing the sides of said shaft sealing means remote from said annular chamber to hydraulic pressure exerted by a liquid,
   and control means for controlling said hydraulic pressure as a function of the pressure of the compressed air inside said annular chamber to limit the pressure difference acting on said shaft sealing means.

2. A clutch as claimed in claim 1, wherein said shaft sealing means comprises packing rings of elastomeric material.

3. A clutch as claimed in claim 1, wherein said control means comprises: a valve body having a bore, a slide valve member sliding in said bore and subdividing said bore into a first and a second chamber, means for connecting said first chamber to said annular chamber to expose one side of said slide valve member to the compressed air pneumatic pressure prevailing inside said annular chamber, means for supplying a flow of liquid to said second chamber to produce a hydraulic pressure therein, a liquid outlet port from said second chamber in said valve body, said slide valve member being arranged to govern said liquid outlet port in a sense to open said outlet port further with increasing of said hydraulic pressure relative to said pneumatic pressure and to restrict said outlet port further with decreasing of said hydraulic pressure relative to said pneumatic pressure, and means for applying said hydraulic pressure to said sides of the shaft sealing means remote from said annular chamber.

4. A clutch as claimed in claim 3, and further comprising a compression spring located in said first chamber and biasing said slide valve member in a sense to further throttle said outlet port.

5. A clutch as claimed in claim 2, wherein said stationary casing comprises a metal ring member surrounding said rotating shaft having an internal surface and end faces, and having a circumferential groove on its internal surface, said circumferential groove defining said annular chamber, packing rings of elastomeric material being located in front of said end faces of said metal ring member, said packing rings each comprising an outwardly extending collar having a beaded edge, and a toroidal spring surrounding said collar and holding it in engagement with said rotating shaft, said metal ring member having axially projecting edge portions at the inner circumference of said end faces, said edge portions supportingly extending below said collar to increase the pressure loading capacity of said packing rings.

6. A clutch as claimed in claim 1, wherein said exposing means comprises hydraulic pressure chambers defined by said stationary casing axially outwards of said shaft sealing means, bearing bushings and piston rings being provided between said casing and said rotating shaft axially outwards of said hydraulic pressure chambers to axially seal said chambers towards atmosphere.

7. A clutch as claimed in claim 6, wherein each of said bearings bushings has radial flange at its inner end, said flange abutting the axially outward end face of the respective adjacent hydraulic pressure chamber.

8. A clutch as claimed in claim 6, wherein outer packing rings made of elastomeric material and engaging said rotating shaft are retained in said stationary casing on both sides of said bearing bushings, annular chambers being defined between said bearing bushings and said outer packing rings, said chambers communicating with drain.

9. A clutch as claimed in claim 1, wherein said shaft has a hardened and ground sleeve affixed thereon inside stationary casing and said sleeve has turned-out end faces, two bushings being also mounted on said shaft, on both sides of said sleeve, said bushings having radial flanges and being axially secured by snap rings, said sleeve, with its turned-out end faces extending over said bushings and with its outer ends abutting said flanges, O-rings being located between said shaft and said turned-off end faces to provide an axial seal.

10. A clutch as claimed in claim 1, and further comprising a sensor responding to the pressure difference between pneumatic and hydraulic pressures, and means operatively connected to said sensor for cutting-off the air supply when said pressure difference exceeds a predetermined threshold.

11. A clutch as claimed in claim 3 and further a compression spring located in said second chamber and biasing said slide valve member in a sense to further open said outlet port.

12. A clutch as claimed in claim 3, wherein said slide valve member has a circumferential groove and is sealingly engaging the wall of said bore of said valve body on both sides of said circumferential groove, a liquid inlet port in said valve casing opening into said bore adjacent said circumferential groove, said circumferential groove communicating with said outlet port through a circumferential slot formed between the inner wall of said bore and the peripheral portions of said slide valve member defining the edge of said circumferential groove, said second chamber of said valve body communicating with said circumferential groove through a restricted passage.

13. A clutch as claimed in claim 1, wherein said control means comprise a closed system partially filled with liquid, the space above the liquid level in said system communicating with said annular chamber, whereby said hydraulic pressure is produced as static pressure.

14. A clutch as claimed in claim 13, wherein said liquid is a highly viscous oil.

15. A clutch as claimed in claim 14, wherein said stationary casing defines annular chambers axially outwards of said shaft sealing means, oil sealing means being provided between said stationary casing and said rotating shaft to seal said annular chambers in oil-tight manner, said chambers communicating with an oil reservoir, a pressure transmitting conduit being connected at one end to a compressed-air supply conduit and opening, at its other end, into said reservoir at the top thereof.

16. A clutch as claimed in claim 15, wherein annular bodies are sealingly and axially movably mounted on said shaft and have their outer end faces in sealing and sliding engagement with the end faces of said annular chambers to seal said annular chambers.

17. A clutch as claimed in claim 16, wherein sleeves of resistant and low-friction material are mounted on the periphery of said annular bodies.

18. A clutch as claimed in claim 16, wherein said annular bodies consist of low-friction synthetic plastics.

19. A clutch as claimed in claim 16, wherein said annular bodies consist of sinter metal.

20. A clutch as claimed in claim 16, wherein said shaft is mounted in said stationary casing in journal bearings axially inwards of said annular bodies.

* * * * *

UNITED STATES PATENT AND TRADEMARK OFFICE
CERTIFICATE OF CORRECTION

PATENT NO. : 3,923,133
DATED : December 2, 1975
INVENTOR(S) : Ilie Chivari

It is certified that error appears in the above-identified patent and that said Letters Patent are hereby corrected as shown below:

| | |
|---|---|
| Col. 2, l. 10 | after "packing", "ring prvide" should be --rings provide-- |
| Col. 2, l. 12 | after "limited", "pressue" should be --pressure-- |
| Col. 2, l. 56 | "As oil" should be --An oil-- |
| Col. 3, l. 44 | after "said", insert --sensor-- |
| Col. 4, l. 17 | before "chamber", "annualar" should be --annular-- |
| Col. 4, l. 18 | "polytetraflourethylene" should be --polytetrafluorethylene-- |
| Col. 4, l. 23 | "surface" should be --surfaces-- |
| Col. 4, line 68 | "projection" should be --projections-- |
| Col. 5, l. 14 | "radical" should be --radial-- |
| Col. 5, l. 57 | after "The", insert --metal-- |
| Col. 10, l. 9 | "claim 2" should be --claim 1-- |
| Col. 10, l. 33 | "bearings" should be --bearing-- |
| Col. 10, l. 45 | before "stationary", insert --said-- |

Signed and Sealed this thirtieth Day of March 1976

[SEAL]

Attest:

RUTH C. MASON
Attesting Officer

C. MARSHALL DANN
Commissioner of Patents and Trademarks